(12) United States Patent
Roman

(10) Patent No.: US 10,512,975 B2
(45) Date of Patent: Dec. 24, 2019

(54) MILLING INSERT AND A MILLING TOOL

(71) Applicant: SANDVIK INTELECTUAL PROPERTY AB, Sandviken (SE)

(72) Inventor: Stefan Roman, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/546,750

(22) PCT Filed: Jan. 15, 2016

(86) PCT No.: PCT/EP2016/050782
§ 371 (c)(1),
(2) Date: Jul. 27, 2017

(87) PCT Pub. No.: WO2016/120099
PCT Pub. Date: Aug. 4, 2016

(65) Prior Publication Data
US 2018/0015554 A1    Jan. 18, 2018

(30) Foreign Application Priority Data
Jan. 30, 2015    (EP) ..................................... 15153154

(51) Int. Cl.
*B23C 5/20*    (2006.01)
*B23C 5/10*    (2006.01)

(52) U.S. Cl.
CPC .............. *B23C 5/207* (2013.01); *B23C 5/109* (2013.01); *B23C 2200/126* (2013.01); *B23C 2200/243* (2013.01)

(58) Field of Classification Search
CPC ......... B23C 5/207; B23C 5/202; B23C 5/109; Y10T 407/23; Y10T 407/235; B23B 2200/126
See application file for complete search history.

(56) References Cited

U.S. PATENT DOCUMENTS 4,946,318 A * 8/1990 David ................... B23C 5/2213
407/42
5,443,334 A    8/1995 Pantzar
(Continued)

FOREIGN PATENT DOCUMENTS

AT    0008743 U1 * 12/2006 ............. B23C 5/109
EP    0699495 A1    3/1996
(Continued)

*Primary Examiner* — Ryan C Rufo
(74) *Attorney, Agent, or Firm* — Corinne R. Gorski

(57) ABSTRACT

A milling insert for shoulder milling having s a positive basic shape and includes an upper side having a rake surface, a lower side including a planar bottom surface, a side surface extending around the periphery of the milling insert, and a cutting edge formed between the side surface and the rake surface. The cutting edge has at least a major cutting edge portion, a corner radius cutting edge portion, a ramping cutting edge portion, and a surface wiping cutting edge portion. The side surface includes an upper set of primary clearance surfaces and a lower set of secondary clearance surfaces having a plurality of planar secondary clearance surfaces, wherein the upper set of primary clearance surfaces forms an overhang protruding with respect to the secondary clearance surfaces and extending around the entire upper periphery of the milling insert.

15 Claims, 7 Drawing Sheets

(56) References Cited

U.S. PATENT DOCUMENTS

| | | | |
|---|---|---|---|
| 5,466,097 A * | 11/1995 | Wallstrom | B23C 5/207 407/113 |
| 5,486,073 A * | 1/1996 | Satran | B23C 5/109 407/113 |
| 5,593,255 A | 1/1997 | Satran et al. | |
| 5,755,536 A | 5/1998 | Vollmer et al. | |
| 5,893,683 A * | 4/1999 | Johnson | B23C 5/109 407/113 |
| 6,053,671 A | 4/2000 | Stedt et al. | |
| 6,196,770 B1 * | 3/2001 | Astrom | B23C 5/109 407/114 |
| 7,040,844 B1 * | 5/2006 | Daiguji | B23C 5/109 407/113 |
| 7,144,205 B2 * | 12/2006 | Sheffler | B23C 5/2221 407/103 |
| 7,520,699 B2 | 4/2009 | Ballas et al. | |
| 7,905,687 B2 | 3/2011 | Dufour et al. | |
| 8,277,151 B2 | 10/2012 | Wandebaeck | |
| 2004/0223818 A1 * | 11/2004 | Sheffler | B23C 5/109 407/48 |
| 2006/0013661 A1 | 1/2006 | Long et al. | |
| 2007/0031201 A1 * | 2/2007 | Maeda | B23C 5/109 407/34 |
| 2008/0170916 A1 * | 7/2008 | Ballas | B23C 5/109 407/42 |
| 2008/0304924 A1 * | 12/2008 | Engstrom | B23C 5/202 407/114 |
| 2009/0279962 A1 * | 11/2009 | Dufour | B23C 5/207 407/37 |
| 2010/0003090 A1 * | 1/2010 | Johansson | B23C 5/202 407/113 |

FOREIGN PATENT DOCUMENTS

| | | | | |
|---|---|---|---|---|
| EP | 1584390 A2 * | 10/2005 | | B23C 5/109 |
| EP | 1752245 A2 | 2/2007 | | |
| EP | 2682215 A2 | 1/2014 | | |
| EP | 3050655 A1 | 8/2016 | | |
| JP | 03-118956 B2 * | 12/2000 | | B23C 5/109 |
| WO | 96/30149 A1 | 10/1996 | | |
| WO | 00/13831 A1 | 3/2000 | | |
| WO | 2004062840 A1 | 7/2004 | | |
| WO | 2014196573 A1 | 12/2014 | | |
| WO | WO 2014196573 A1 * | 12/2014 | | B23C 5/109 |

* cited by examiner

MILLING INSERT AND A MILLING TOOL

RELATED APPLICATION DATA

This application is a § 371 National Stage Application of PCT International Application No. PCT/EP2016/050782 filed Jan. 15, 2016 claiming priority of EP Application No. 15153154.8, filed Jan. 30, 2015.

TECHNICAL FIELD OF THE INVENTION

The present invention relates to a milling insert intended for shoulder milling and to a milling tool.

BACKGROUND OF THE INVENTION AND PRIOR ART

Milling tools for shoulder milling, such as shank-end milling tools, may advantageously be used for machining of shoulders, grooves and edges. For the machining of pockets and the like, it is preferable to use a milling tool having a ramping cutting edge portion, i.e. a cutting edge portion that is closer to a central axis of the milling tool than a major cutting edge portion used in the machining, and which is formed at an angle with respect to a surface wiping cutting edge portion. For cost-efficiency, it is preferable to use a milling tool which comprises on one hand a tool body, and on the other hand detachable and replaceable milling inserts.

US2006/0013661 discloses a milling insert and a milling tool intended for shoulder milling. The milling insert is indexable and has a positive basic shape. It comprises an upper side comprising a rake surface and a lower side opposite to the upper side. The lower side comprises a planar bottom surface serving as a bottom support surface when the milling insert is mounted in a tool body. A side surface extends between the upper side and the lower side around the periphery of the milling insert. A cutting edge is formed between the side surface and the rake surface. The cutting edge comprises a major cutting edge portion, a corner radius cutting edge portion, a ramping cutting edge portion, and a surface wiping cutting edge portion positioned between the corner radius cutting edge portion and the ramping cutting edge portion. The ramping cutting edge portion and the surface wiping cutting edge portion form an angle with respect to each other.

The milling insert disclosed in US2006/0013661 has a "margin" extending below the corner radius cutting edge portion and along the major cutting edge portion, which is formed at a smaller angle than the side surface below the margin with respect to a plane parallel with the cutting edge. In other words, a clearance angle below said portions of the cutting edge is larger near the lower side of the milling insert than near the upper side. The purpose of this is to facilitate the formation of linear walls on the work piece under certain milling conditions. However, this milling insert is not optimized with regard to ease of production. Moreover, the geometry of the milling insert does not enable adaptation of the cutting edge and the clearance surfaces to different milling conditions. Typically, the primary clearance behind the major cutting edge portion will vary along the major cutting edge portion, thus leading to irregular wear of the cutting edge and a strength of the cutting edge which varies along the major cutting edge portion.

SUMMARY OF THE INVENTION

A primary object of the present invention is to provide a milling insert and a milling tool suitable for ramping and for shoulder milling of small details, which milling insert and milling tool have properties optimized with regard to cutting precision, attachment precision and stability of the milling insert in the tool body of the milling tool, and wherein the production of the milling insert as well as the machining of the insert seat in the tool body is facilitated with respect to known milling inserts and milling tools. Another object is to provide a milling insert which may be adapted to achieve an optimised primary clearance behind the cutting edge without compromising the stability of the milling insert in the milling tool. Yet another object is to provide a milling insert on which flank wear can be more easily analysed and on which such wear of the cutting edge does not affect the support surfaces of the milling insert.

At least the primary object is, according to a first aspect of the invention, achieved by a milling insert as initially defined. The milling insert is characterized in that the side surface comprises an upper set of primary clearance surfaces, and a lower set of secondary clearance surfaces including a plurality of planar support surfaces, wherein the upper set of primary clearance surfaces forms an overhang protruding with respect to the secondary clearance surfaces and extending around the entire upper periphery of the milling insert.

By providing the milling insert with an upper set of primary clearance surfaces forming an overhang, the side surface is divided into an upper part and a lower part, wherein the lower part can be used for supporting the milling insert in the tool body of a milling tool. Thus, both the upper part and the lower part of the milling insert may be optimised for their respective use. The secondary clearance surfaces include a plurality of planar support surfaces (i.e. made flat), providing excellent axial and radial support and stability in the interface between the milling insert and the tool body. Preferably, except below the corner radius cutting edge portion, each secondary clearance surface in the lower set of clearance surfaces is formed by a single planar surface, whereby at least two of these planar surfaces will serve as an axial and a radial support surface respectively in each index position. The primary clearance surfaces and thereby also the cutting edge, can be designed independently of the flat design of the secondary clearance surfaces. This allows adaptation of the cutting edge for an improved chip cutting result without compromising the stability of the milling insert in the tool body. Furthermore, flank wear can be more easily analysed and such wear of the cutting edge does not affect the support surfaces of the milling insert. Manufacturing of the milling insert, and in particular machining of the cutting edge (e.g. brushing, grinding and blasting), is furthermore facilitated, since machining of the cutting edge can be performed without affecting the planar support surfaces.

According to an embodiment of the invention, the cutting edge extends in parallel or essentially in parallel with the bottom surface. "Essentially parallel" is here intended to mean within engineering tolerance. The parallel or essentially parallel design provides improved chip control since it creates more space for the chip on the rake surface of a relatively small diameter milling tool. It also provides improved chip formation since it enables creation of a larger and smoother rake surface than in the case with a non-parallel design of the cutting edge, since the rake surface on the upper surface can be formed at the same distance or level from the cutting edge around the entire milling insert, whereby for instance a tendency of over breaking the chips at larger cutting depths can be avoided. The parallel design furthermore simplifies manufacturing of the milling insert using a pressing process, and it also facilitates brushing, grinding and/or blasting of the cutting edge.

According to another embodiment of the invention, the rake surface comprises a planar central region extending in parallel with or essentially in parallel with the bottom surface. "Essentially parallel" is here intended to mean within engineering tolerance. This is particularly suitable for a milling insert with the cutting edge formed in parallel with the bottom surface, wherein the planar central region of the rake surface is recessed with respect to the cutting edge. The planar central region promotes chip formation/control and also contributes to a simplified production process.

According to another embodiment of the invention, the major cutting edge portion is convex as seen in a plane parallel with the bottom surface. In other words, the milling insert may have its largest width as measured through a central axis of the milling insert, wherein the width is measured in a plane parallel with the bottom surface. In the case the cutting edge has a non-parallel design, the width may be measured in a projected plane. The convex major cutting edge portion contributes to the formation of a smooth machined surface on the workpiece.

According to another embodiment of the invention, as seen in a plane parallel with the bottom surface, a chord of the major cutting edge portion forms a chord angle $\alpha$ within the interval $0°<\alpha<1°$ with the secondary clearance surface below the major cutting edge portion. The part of the secondary clearance surface below the major cutting edge portion which is located near the lower side of the milling insert is in this way protected from contact with the workpiece. In particular, this is a preferred design for milling inserts intended for use in small diameter milling tools in which the milling insert is mounted at a positive axial tipping-in angle. With this design, protection from contact with the workpiece can be achieved without having to reduce the size of the bottom surface and thus the stability of the milling insert in the tool body.

According to another embodiment of the invention, the milling insert has a thickness $t_{tot}$ in a direction perpendicular to the bottom surface, wherein the lower set of secondary clearance surfaces extends over at least 50% of the thickness $t_{tot}$, preferably over at least 60% of the thickness $t_{tot}$, more preferably over at least 70% of the thickness $t_{tot}$. In this way, a more stable contact between support surfaces of the milling insert and the tool body is achieved.

According to another embodiment of the invention, the overhang has a thickness $t_{oh}$ within the range $0.20$ mm$\leq t_{oh} \leq 0.5$ mm in a direction perpendicular to the bottom surface, preferably within the range $0.25$ mm$\leq t_{oh} \leq 0.5$ mm, more preferably within the range $0.3$ mm$\leq t_{oh} \leq 0.4$ mm. This is primarily intended to allow an acceptable amount of flank wear on the cutting edge without affecting the secondary clearance surfaces. This will also facilitate detection of an acceptable amount of flank wear (e.g. in a range of 0.2-0.3 mm) in that the overhang exhibits said flank wear over the entire or substantially the entire thickness, indicating that a change of index position or a change of the entire insert is necessary.

According to another embodiment of the invention, wherein when the milling insert is mounted in a tool body, at least one of the planar support surfaces is configured to form an axial support surface and at least another one of the planar support surfaces is configured to form a radial support surface, the radial support surface and the axial support surface form a sharp angle with each other as seen in a plane parallel with the bottom surface. This results in a stable support for the milling insert in the tool body. Preferably, the angle is within the interval 60°-80°, more preferably within the interval 65°-75°. The planar support surface used as a radial support surface is preferably the surface below the inactive major cutting edge portion, in the case of an indexable milling insert. The planar support surface used as an axial support surface is in this case preferably the surface below the inactive ramping cutting edge portion.

According to another embodiment of the invention, the secondary clearance surfaces are formed at sharp seating angles with respect to an upper extension plane parallel with the bottom surface. Thus, a positive basic shape with a larger upper side than lower side is achieved without having to make the overhang too pronounced.

According to another embodiment of the invention, the cutting edge comprises an additional cutting edge portion positioned between, and forming an angle with, the surface wiping cutting edge portion and the ramping cutting edge portion. This is preferable for small corner radii to preserve the position of the ramping cutting edge portion and shorten the length of the surface wiping cutting edge. Preferably, the additional cutting edge portion is formed at an angle of 2°-4° with respect to the surface wiping cutting edge portion. In other words, the additional cutting edge clears from the workpiece and the surface wiping cutting edge is not made too long so that axial cutting forces generated by the same will exceed acceptable levels and thereby cause detrimental vibrations in the tool during milling.

According to another embodiment of the invention, the primary clearance surface below the major cutting edge is formed at an overhang angle $\beta_{major}$ with respect to an upper extension plane parallel with the bottom surface, which overhang angle $\beta_{major}$ decreases from the corner radius cutting edge portion and along the major cutting edge portion, so that an effective clearance angle along the major cutting edge portion is constant or substantially constant when the milling insert is mounted at a positive axial tipping-in angle in a tool body. This ensures sufficient clearance also at large cutting depths.

According to another embodiment of the invention, the secondary clearance surface below the major cutting edge portion is formed at a seating angle $\eta_{major}$ with respect to the upper extension plane, which seating angle $\eta_{major}$ is constant or substantially constant along the major cutting edge portion. In this context, "substantially constant" is to be understood as within engineering tolerance. This gives a relatively large and planar secondary clearance surface which may be used as a support surface for supporting the milling insert in the tool body. The relatively large support surface that can be achieved facilitates machining of the insert seat of the tool body in which the milling insert is to be mounted while ensuring a stable interface between milling insert and tool body.

According to another embodiment of the invention, the primary clearance surface below the ramping cutting edge portion is formed at a sharp overhang angle $\beta_{ramp}$ with respect to an upper extension plane parallel with the bottom surface, the secondary clearance surface below the ramping cutting edge portion is formed at a sharp seating angle $\eta_{ramp}$ with respect to said upper extension plane, and $\beta_{ramp} < \eta_{ramp}$. In other words, the primary clearance surface below the ramping cutting edge portion is formed at a sharper angle than the secondary clearance surface. This results in sufficient primary clearance behind the ramping cutting edge portion also at relatively large radial tipping-in angles without compromising the stability of the milling insert in the tool body, in particular when the secondary clearance surface below the ramping cutting edge portion is used as a support surface.

According to another embodiment of the invention, below each of the major cutting edge portion, the corner radius cutting edge portion, and the surface wiping cutting edge portion, the secondary clearance surface associated with the respective cutting edge portion is formed at a sharp seating angle η with respect to an upper extension plane parallel with the bottom surface, and the primary clearance surface associated with the respective cutting edge portion is formed at a sharp overhang angle β with respect to said upper extension plane, wherein the seating angle η is smaller than the overhang angle β.

According to another embodiment of the invention, the milling insert is indexable with two index positions. The milling insert thus has a two-folded rotational symmetry with two major cutting edge portions, two surface wiping cutting edge portions, two ramping cutting edge portions, etc. Depending on index position, only one of the major cutting edge portions is active at a time. This prolongs the tool life of the milling insert.

In a second aspect, the invention relates to a milling tool comprising a tool body and at least one milling insert according to any one of the above mentioned embodiments, wherein each of the at least one milling inserts is detachably mounted in an insert seat of the tool body. Advantages and preferable embodiments of such a milling tool correspond to those discussed above for the milling insert.

BRIEF DESCRIPTION OF THE DRAWINGS

A detailed description of embodiments of the invention with reference to the appended drawings follows below. In the drawings.

DETAILED DESCRIPTION OF EMBODIMENTS OF THE INVENTION

Figure 1:
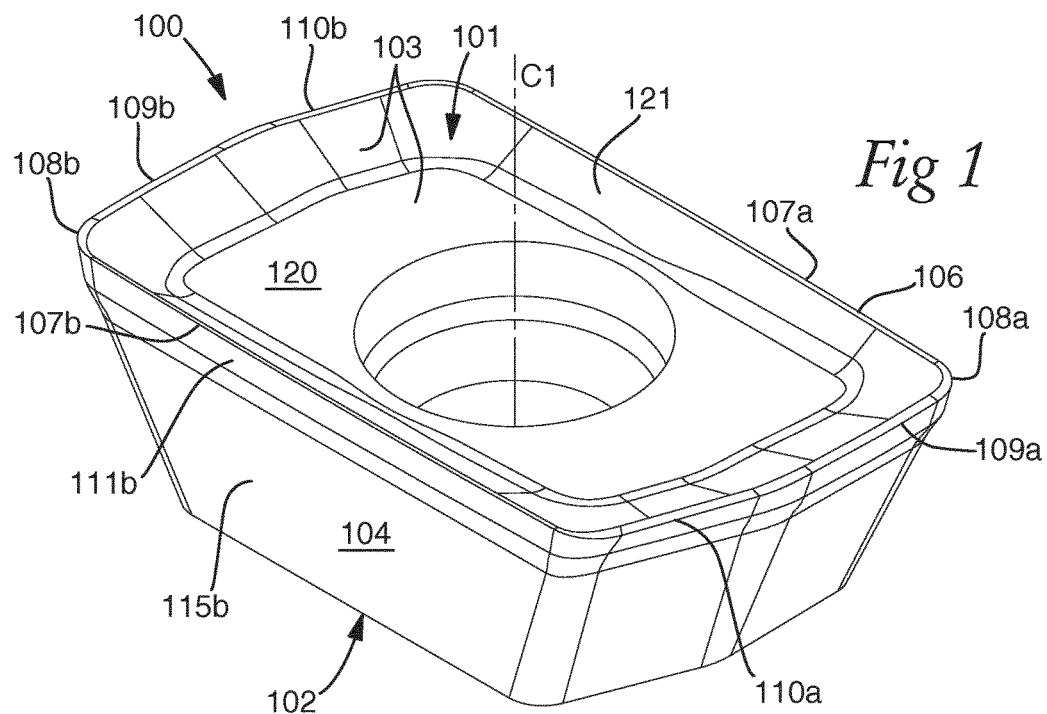
FIG. 1 shows a perspective view of a milling insert according to an embodiment of the invention.
Figure 2:
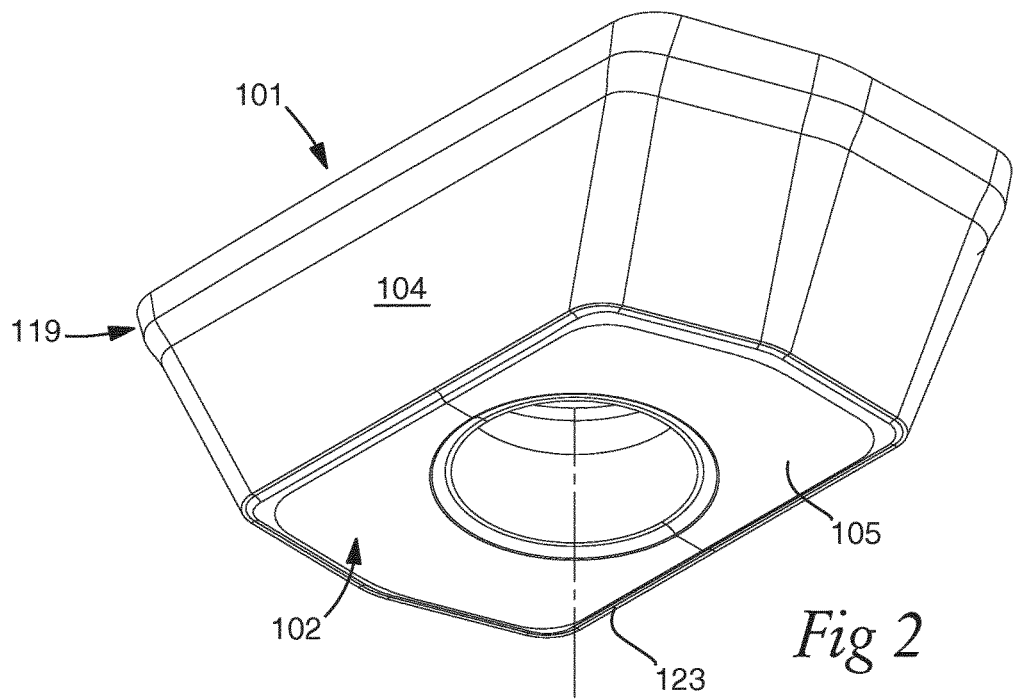
FIG. 2 shows a perspective view of the milling insert in FIG. 1.
Figure 3:
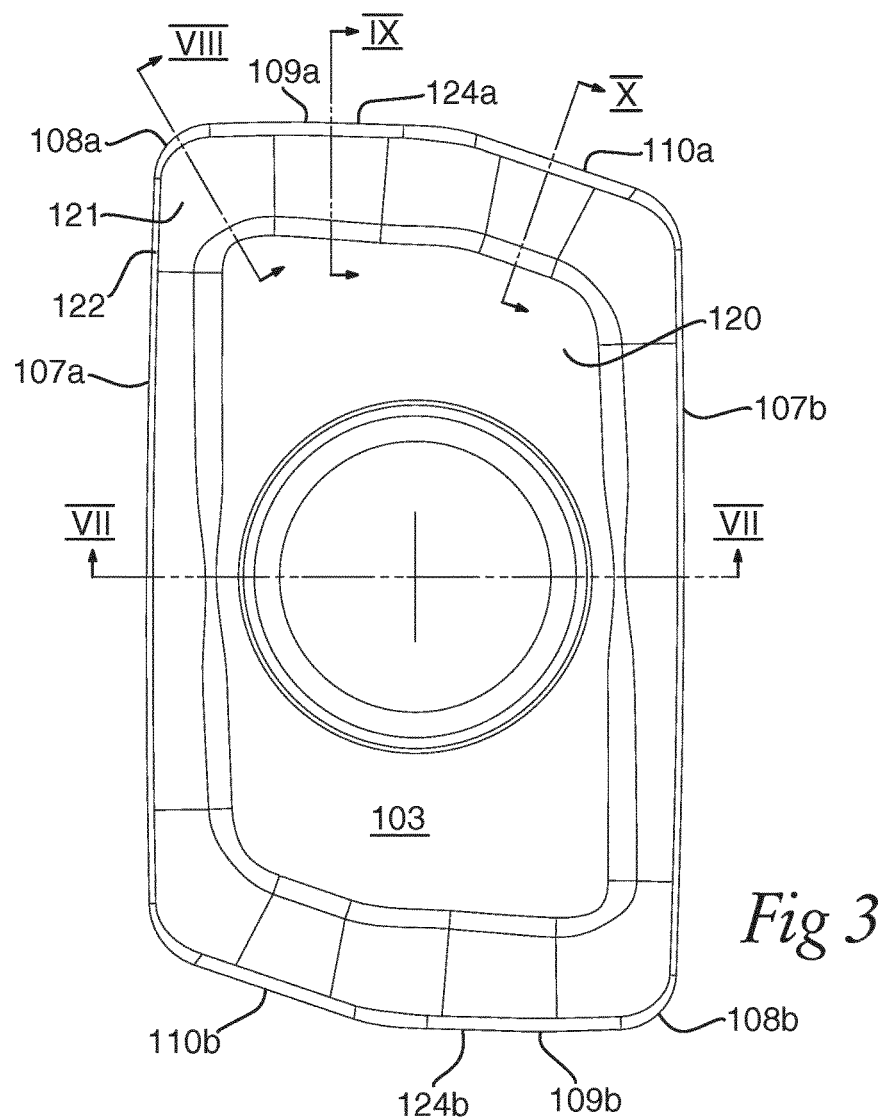
FIG. 3 shows a top view of the milling insert in FIG. 1.
Figure 4:
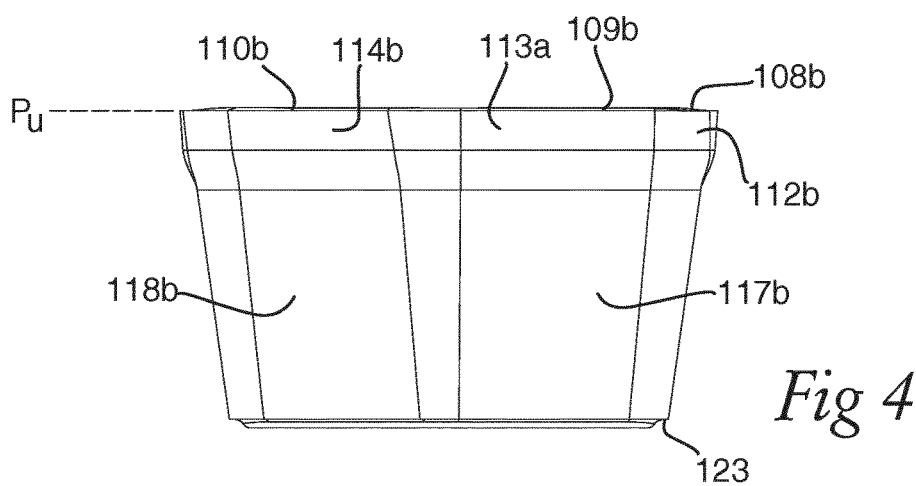
FIG. 4 shows a side view of the milling insert in FIG. 1.

FIG. 1-10 show different views of a milling insert 100 intended for shoulder milling, i.e. milling at an entering angle of 90° according to an embodiment of the invention. The milling insert 100 is indexable with two index positions and has a positive basic shape. It comprises an upper side 101 and a lower side 102 opposite the upper side 101. A central axis C1 extends between the upper side 101 and the lower side 102. A central hole is provided for mounting the milling insert in a tool body. The upper side 101 comprises a rake surface 103 having a planar central region 120 extending around the central hole. The lower side 102 comprises a planar bottom surface 105. Around the periphery of the milling insert, a side surface 104 extends. A cutting edge 106 is formed between the rake surface 103 and the side surface 104. An upper extension plane $P_U$ is defined, extending in parallel with the bottom surface 105 at the level of the cutting edge 106. The cutting edge 106 extends in parallel, or essentially in parallel, with the upper extension plane $P_U$. The planar central region 120 of the rake surface 103 is recessed with respect to the cutting edge 106, wherein an inclined surface 121 of the rake surface 103 extends from the planar central region 120 toward the cutting edge 106. A reinforcement land 122 is formed between the inclined surface 121 and the cutting edge 106.

Since the milling insert 100 has two index positions, the cutting edge 106 comprises two major cutting edge portions 107a, 107b formed to be active one at a time. The cutting edge 106 further comprises two corner radius cutting edge portions 108a, 108b, two surface wiping cutting edge portions 109a, 109b, and two ramping cutting edge portions 110a, 110b. Each surface wiping cutting edge portion 109a, 109b is positioned between its associated corner radius cutting edge portion 108a, 108b and its associated ramping cutting edge portion 110a, 110b and forms a right angle or an essentially right angle with its associated major cutting edge portion 107a, 107b. The angle between the surface wiping cutting edge 109a, 109b and the major cutting edge portion 107a, 107b is designed to generate a 90° shoulder in the workpiece during a milling operation. However, this angle may vary depending on the radial and the axial tipping-in angle on the mounted insert 100 in the insert seat of the tool body. In this specific embodiment the surface wiping cutting edge portions 109a, 109b form a 92° angle with the major cutting edge portions 107a, 107b due to its intended mounting at a negative radial and positive axial tipping-in angle (further described below) in order to generate the 90° shoulder in the workpiece. Each ramping cutting edge portion 110a, 110b is formed at sharp angle with respect to the associated major cutting edge portion 107a, 107b to allow ramping of a workpiece. In the shown embodiment, the ramping cutting edge portion 110a, 110b is formed at an angle of approximately 70° with respect to the major cutting edge portion 107a, 107b.

Figure 6:
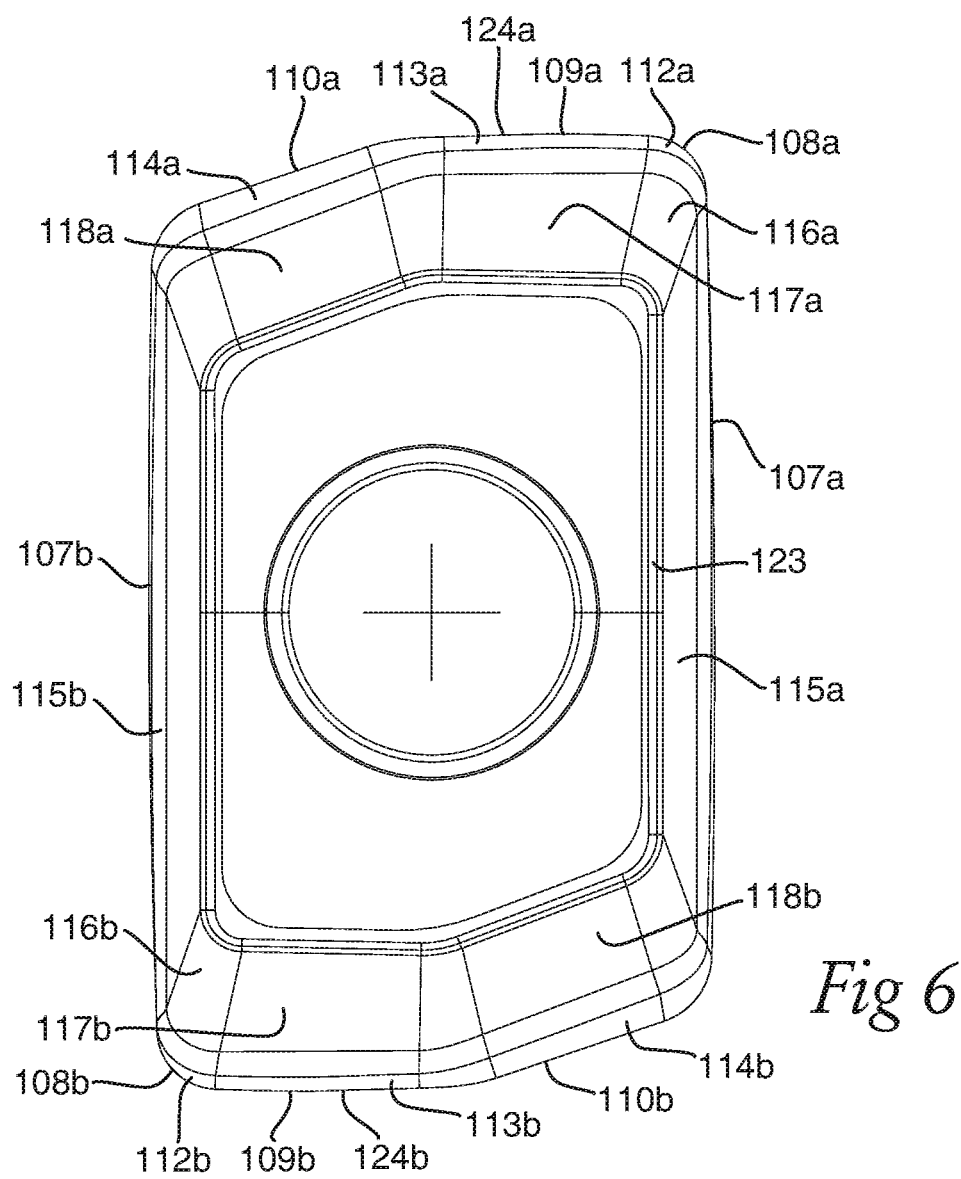
FIG. 6 shows a bottom view of the milling insert in FIG. 1.
Figure 7:
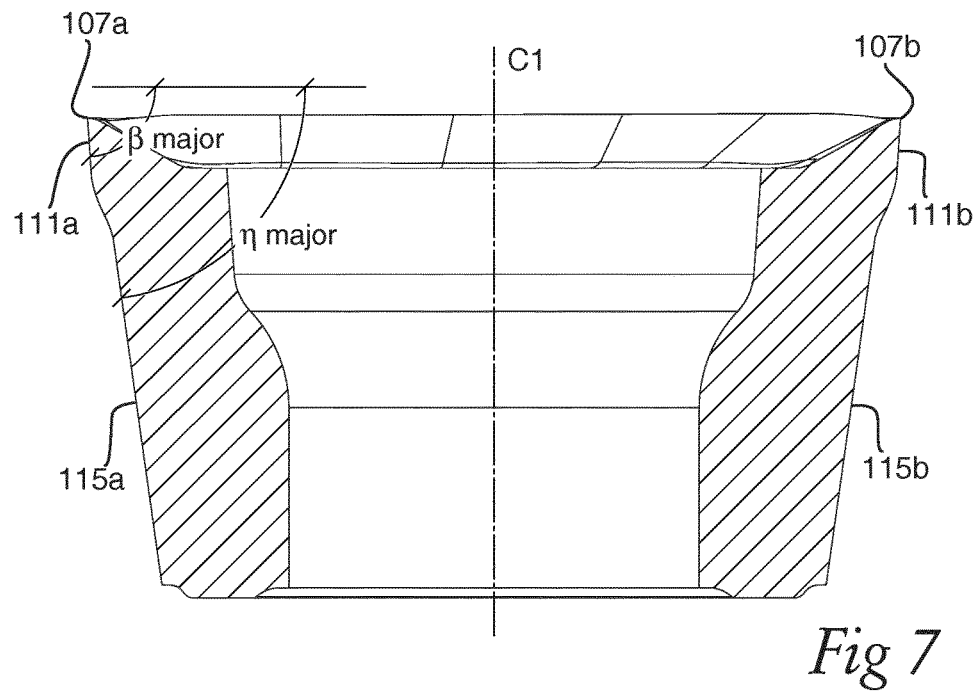
FIG. 7 shows a cross section of the milling insert along the line VII-VII in FIG. 3.
Figure 8:
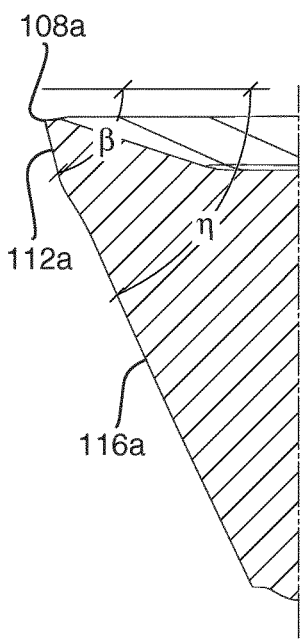
FIG. 8 shows a partial cross section of the milling insert along the line VIII-VIII in FIG. 3.
Figure 9:
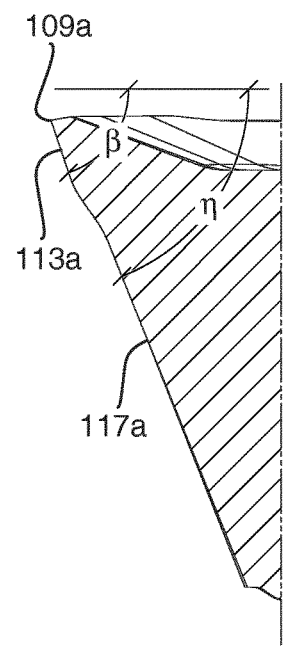
FIG. 9 shows a partial cross section of the milling insert along the line IX-IX in FIG. 3.
Figure 10:
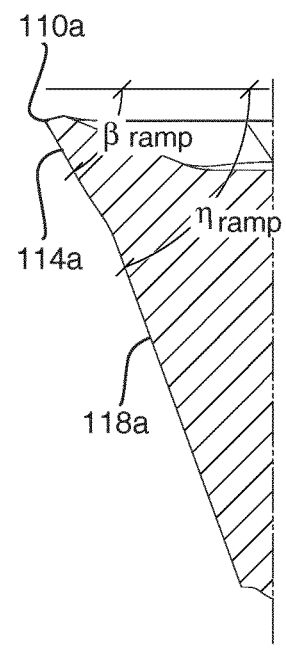
FIG. 10 shows a partial cross section of the milling insert along the line X-X in FIG. 3.

Below each of the cutting edge portions 107a-110b, the side surface 104 comprises an upper set of primary clearance surfaces 111a, 111b, 112a, 112b, 113a, 113b, 114a, 114b, formed immediately below the cutting edge 106, and a lower set of secondary clearance surfaces 115a, 115b, 116a, 116b, 117a, 117b, 118a, 118b, formed below the primary clearance surfaces 111a-114b as shown in FIG. 6. Each of the secondary clearance surfaces 115a-118b is associated with a primary clearance surface 111a-114b below which it extends. The secondary clearance surfaces 115a, 115b located below the major cutting edge portions 107a, 107b form radial support surfaces for supporting the milling insert 100 in the insert seat of a tool body, wherein the secondary clearance surface 115b below the inactive major cutting edge portion 107b forms the radial support surface when the major cutting edge portion 107a is active and vice versa. The secondary clearance surfaces 118a, 118b located below the ramping cutting edge portions 110a, 110b, respectively, form axial support surfaces, wherein the secondary clearance surface 118b is an active support surface when the major cutting edge portion 107a is active and vice versa. The secondary clearance surfaces 115a, 115b, 118a, 118b formed as support surfaces are planar surfaces, as well as the secondary clearance surfaces 117a, 117b located below the surface wiping cutting edge portions 109a, 109b. Each of the secondary clearance surfaces is formed at a sharp seating angle η with respect to the upper extension plane $P_U$. The seating angle η varies around the milling insert. Each of the secondary clearance surfaces 118a, 118b, acting as an axial support surface, is formed at a sharp angle of approximately 70° with respect to the associated secondary clearance surface 115a, 115b acting as a radial support surface.

The primary clearance surfaces 111a, 111b, 112a, 112b, 113a, 113b, 114a, 114b form an overhang 119 extending around the entire upper periphery of the milling insert 100 just below the cutting edge 106. The overhang 119 protrudes with respect to the lower part of the milling insert 100. This means that extension planes in which the planar secondary clearance surfaces 115a, 115b, 117a, 117b, 118a, 118b extend are located inside the associated primary clearance surfaces with respect to the central axis C1.

Figure 5:
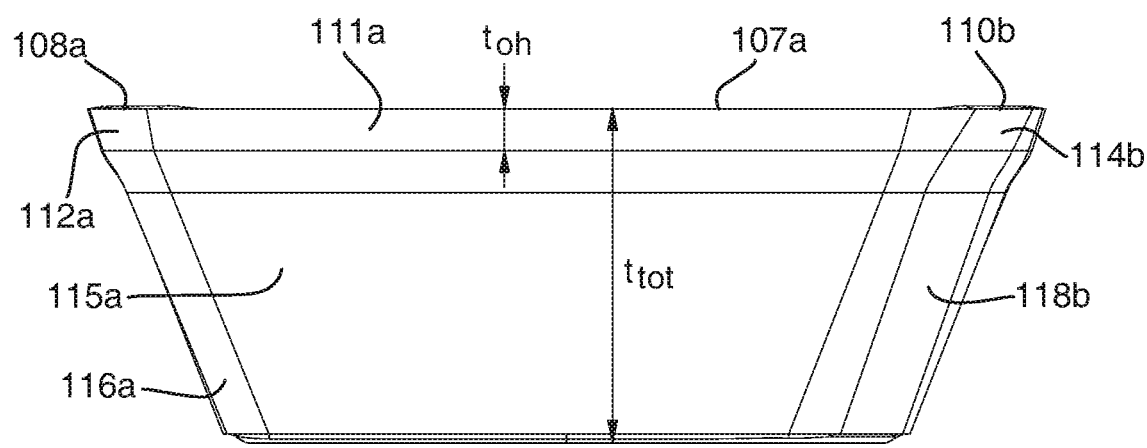
FIG. 5 shows a side view of the milling insert in FIG. 1.

As shown in FIG. 5, the milling insert 100 has a thickness $t_{tot}$ in a direction perpendicular to the bottom surface 105. Here, the thickness $t_{tot}$ is approximately 2.4 mm, but $t_{tot}$ may be up to 6 mm for larger milling inserts according to the invention. The lower set of secondary clearance surfaces 115a-118b extends over at least 50% of the thickness $t_{tot}$, preferably over at least 60% of the thickness $t_{tot}$, more preferably over at least 70% of the thickness $t_{tot}$. For large milling inserts, with a larger thickness $t_{tot}$, the lower set of clearance surfaces may extend over more than 85% of the total thickness $t_{tot}$. The overhang has a thickness $t_{oh}$ which is here 0.3 mm and which should preferably be within the range 0.20 mm≤$t_{oh}$≤0.5 mm, and more preferably within the range 0.25 mm≤$t_{oh}$≤0.5 mm. The thickness $t_{oh}$ of the overhang 119 is chosen to allow an acceptable amount of wear on the cutting edge 106, and is therefore independent of the total thickness $t_{tot}$ of the milling insert 100. The lower set of secondary clearance surfaces 115a-118b in the shown embodiment extends over approximately 75% of the thickness $t_{tot}$ of the milling insert 100.

The primary clearance surfaces 111a-114b are formed at a sharp overhang angle β with respect to the upper extension plane $P_U$ as shown in FIG. 7-10. Below the ramping cutting edge portion 110a, 110b, the overhang angle $β_{ramp}$ is smaller than the seating angle $η_{ramp}$ that the secondary clearance surface 118a, 118b makes with the upper extension plane $P_U$. In the shown embodiment, the overhang angle $β_{ramp}$ decreases along the ramping cutting edge portion 110a, 110b, from approximately 63° closest to the surface wiping cutting edge portion 109a, 109b to approximately 57°. The seating angle $η_{ramp}$ is approximately 70°. Below the corner radius cutting edge portion 108a, 108b and the surface wiping cutting edge portion 109a, 109b, the seating angle η is smaller than the overhang angle β. The overhang angle β is here above 70°, while the seating angle η is below 70°.

Below and along the major cutting edge portion 107a, 107b, the seating angle $η_{major}$ (see FIG. 7) is constant and approximately 82°. The overhang angle $β_{major}$ here varies along the major cutting edge portion 107a, 107b, from approximately 89° close to the corner cutting edge portion 108a, 108b to approximately 83° at the maximum cutting depth. Functionally, when mounted in a milling tool with a radial tipping-in angle of between −11° to −18° and an axial tipping-in angle of 8° to 10° (see further explanation below), this gives a constant effective primary clearance angle of between 10°-15° just behind the major cutting edge portion 107a, 107b, while an effective secondary clearance angle behind the overhang 119 decreases along the major cutting edge portion 107a, 107b, and is approximately 10° at the maximum cutting depth.

The major cutting edge portion 107a, 107b is in the shown embodiment convex as seen in the upper extension plane PU. A chord of the major cutting edge portion 107a, 107b forms a chord angle α of 24' with the secondary clearance surface 115a, 115b. The chord angle α should preferably be within the interval 0°<α<1°.

The milling insert 100 in the shown embodiment further comprises two additional cutting edge portions 124a, 124b, each formed between one of the surface wiping cutting edge portions 109a, 109b and one of the ramping cutting edge portions 110a, 110b. Each additional cutting edge portion 124a, 124b is formed at an angle with respect to the adjacent surface wiping cutting edge portion, which angle may be approximately 2°-4°. Here, each primary clearance surface 113a, 113b below the surface wiping cutting edge portions 109a, 109b, is shown as a single surface extending also below the additional cutting edge portion 124a, 124b.

The lower side 102 of the milling insert 100, apart from the bottom surface 105, also comprises a circumferential surface 123, which is raised with respect to the bottom surface 105, meaning that it is closer to the upper side 101 than the bottom surface 105. This circumferential surface 123 is formed for manufacturing purposes. Since the milling insert 100 according to the invention is preferably manufactured using a pressing process with as little machining as possible needed after pressing, it is important that no parts of the milling insert protrude below the bottom surface 105, serving as a bottom support for the milling insert in the tool body, after pressing. The circumferential surface 123 ensures that no residuals from the pressing process protrude below the bottom surface 105 after pressing.

Figure 11:
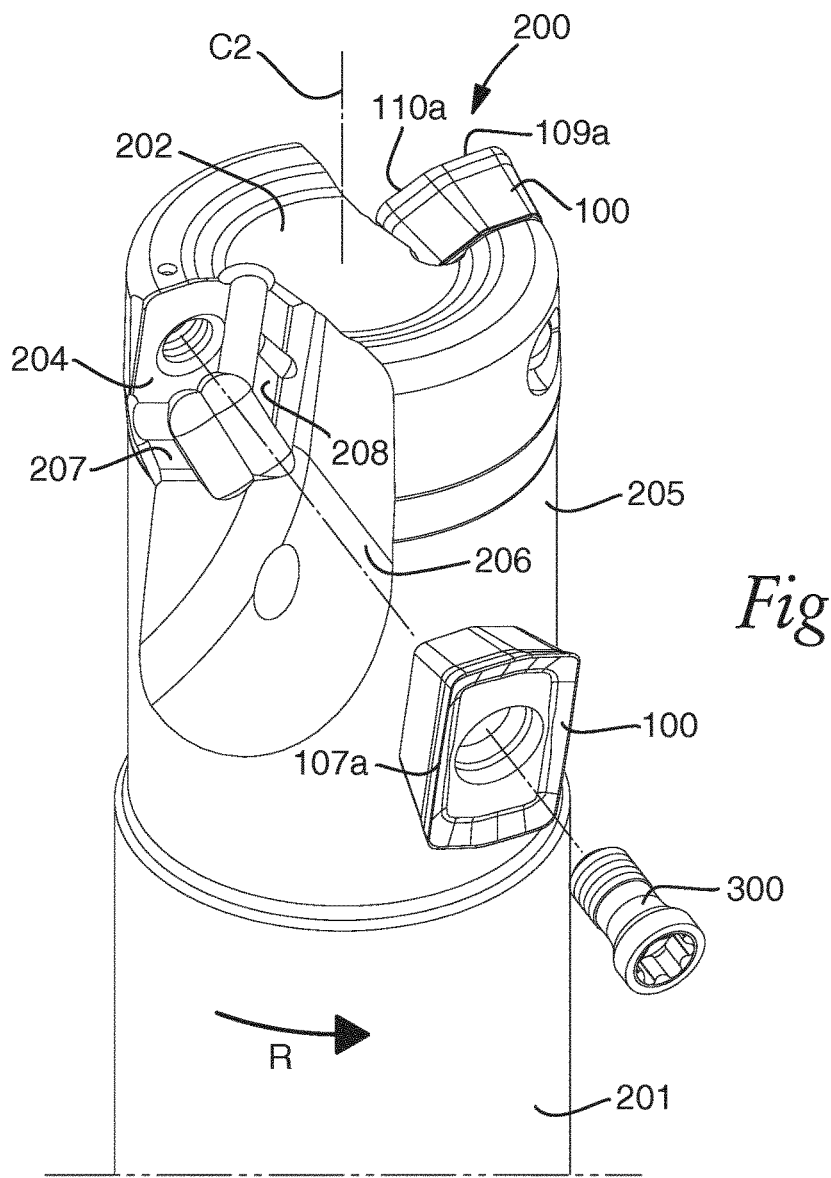
FIG. 11 shows a partly exploded perspective view of a milling tool according to an embodiment of the invention.
Figure 12:
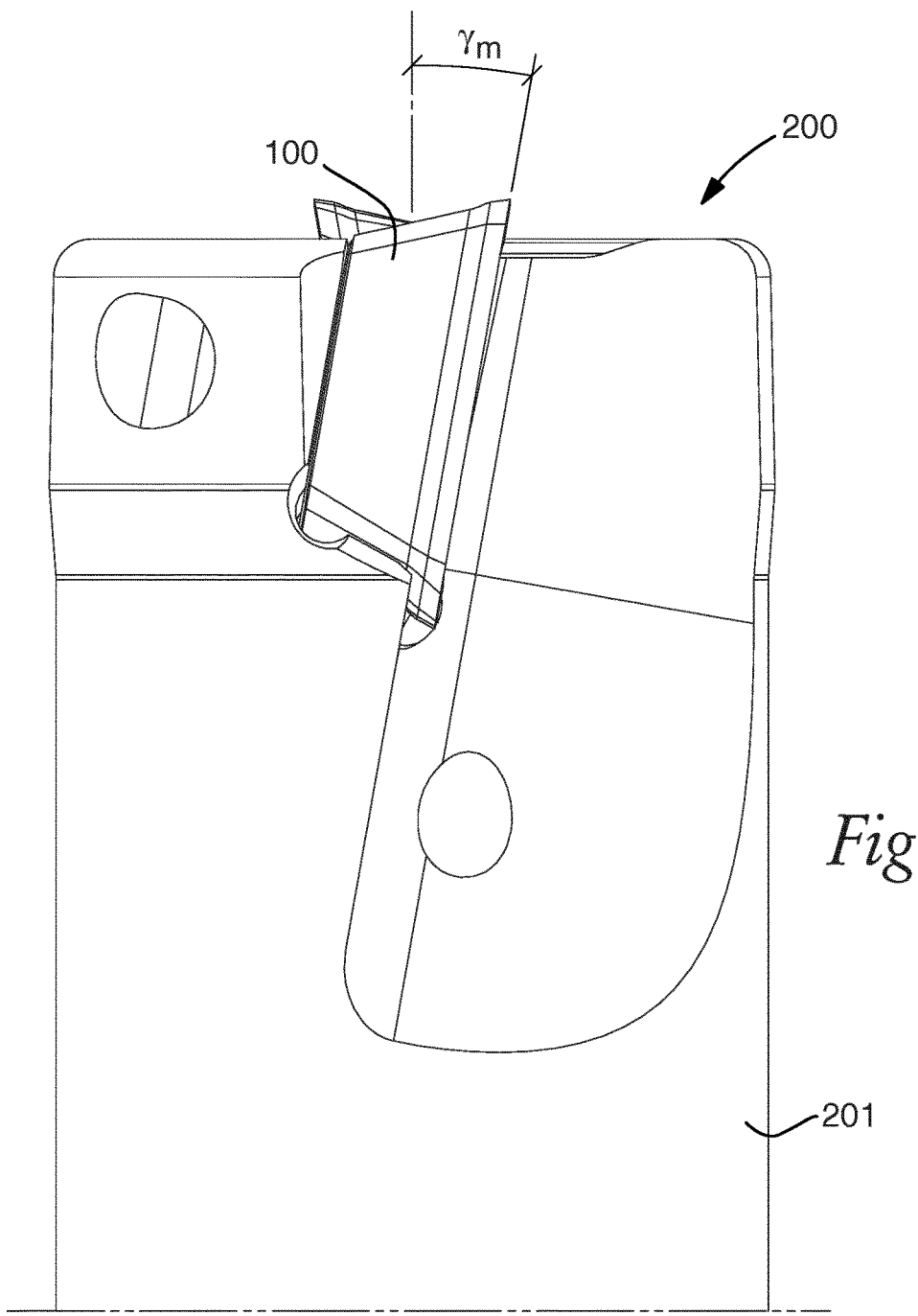
FIG. 12 shows a side view of the milling tool in FIG. 11.
Figure 13:
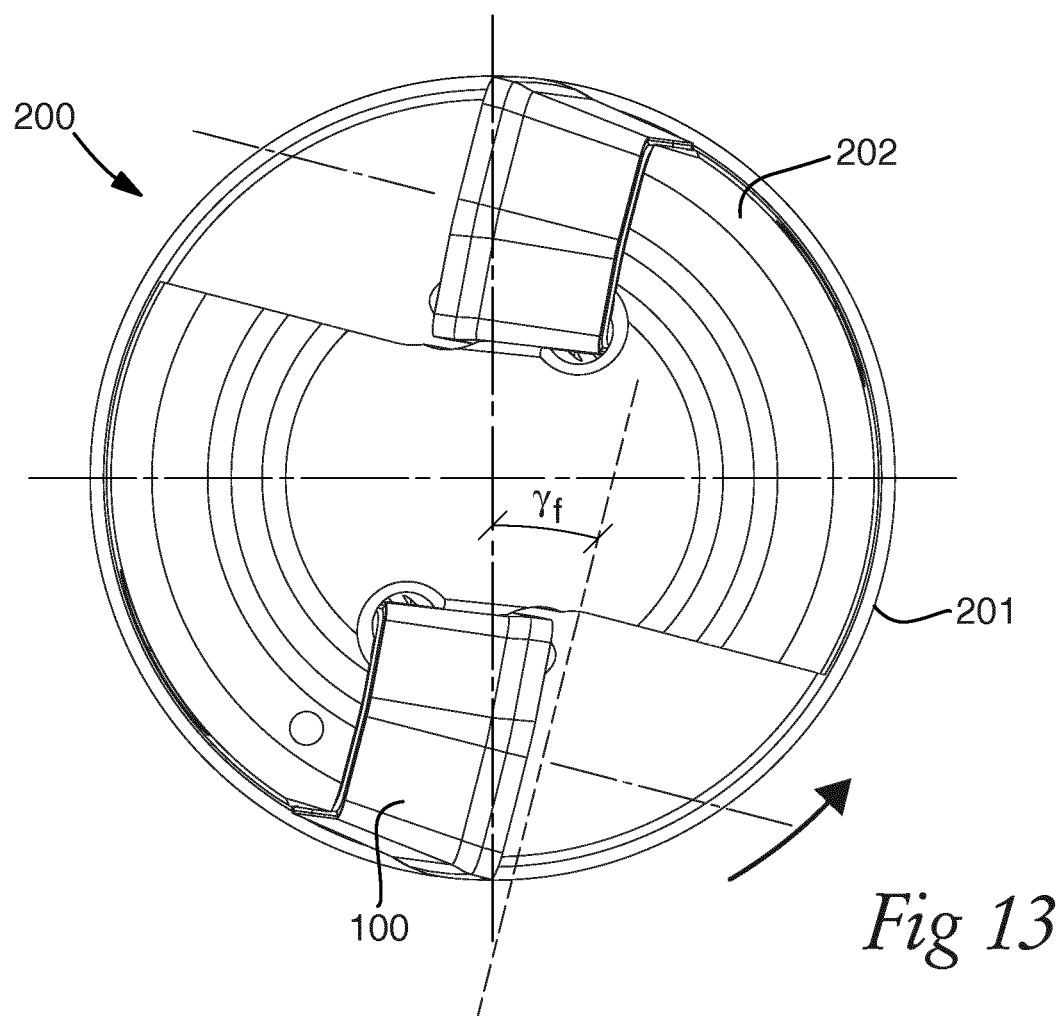
FIG. 13 shows a top view of the milling tool in FIG. 11.

Reference is now made to FIG. 11-13, showing a milling tool 200 for shoulder milling according to the invention. The milling tool 200 comprises a tool body 201 with a cylindrical base shape. The tool body includes a front end 202 and a rear end 203, between which a central rotation axis C2 extends. The tool 200 is rotatable in a direction of rotation R around the central rotation axis C2. Two insert seats 204 are formed in a transition between the front end 202 and a peripheral surface 205 extending between the front end 202 and the rear end 203. A chip pocket 206 is provided rotationally ahead of the at least one insert seat 204. In each insert seat 204, a milling insert 100 as described above is securely mounted by means of a fastening member 300 in the form of a screw, with the bottom surface 105 abutting the insert seat 204 and with the major cutting edge portion 107a being active. An axial contact surface 207 is provided for supporting the axial support surface of the milling insert 100, in this case the secondary clearance surface 118b. A radial contact surface 208 is provided for radially supporting the milling insert 100 along the secondary clearance surface 115b.

The milling insert 100 is mounted in the tool body 101 at a radial tipping-in angle $γ_f$ and an axial tipping-in angle $γ_m$. The radial tipping-in angle $γ_f$, shown in FIG. 13, is the angle between the upper extension plane $P_U$ of the milling insert 100 and a line along the radial vector r of the tool as seen in planar view. The radial tipping-in angle $γ_f$ is in this case negative and approximately −15°, i.e. the upper extension plane $P_U$ is inclined outward/forward. The radial tipping in-angle may vary between −11° to −18° depending on milling tool diameter. The axial tipping-in angle $γ_m$, shown in FIG. 12, is the angle between the upper extension plane $P_U$ of the milling insert 100 and the central rotation axis C2 of the tool. The milling insert 100 is here mounted at a positive axial tipping-in angle $\gamma_m$ of approximately 10°, i.e. the upper extension plane $P_U$ leans in the upward/rearward direction. For milling tools with a diameter of less than 12 mm, the axial tipping-in angle $\gamma_m$ may be set to 8°. Together with an overhang angle $\beta_{major}$ of approximately 89° close to the corner and 83° at the maximum cutting depth, the axial and radial tipping-in angles should result in an effective clearance of 10°-15° during a milling operation.

The tool body 201 of the milling tool 200 is usually manufactured from steel, while the milling inserts 100 are manufactured from a harder material, in particular cemented carbide.

The invention is of course not limited to the embodiments disclosed but may be varied and modified within the scope of the appended claims. For example, the milling insert may be formed as a non-indexable milling insert with a single major cutting edge portion. The milling insert may be designed for left hand rotation of the tool as well as for right hand rotation of the tool.

The invention claimed is:

1. A milling insert for mounting in a shoulder milling tool, the milling insert having a positive basic shape and comprising:
   an upper side having a rake surface;
   a lower side opposite the upper side, the lower side including a planar bottom surface;
   a side surface extending between the upper side and the lower side and around a periphery of the milling insert; and
   a cutting edge formed between the side surface and the rake surface, the cutting edge including at least a major cutting edge portion, a corner radius cutting edge portion, a ramping cutting edge portion, and a surface wiping cutting edge portion positioned between the corner radius cutting edge portion and the ramping cutting edge portion and forming an angle with the ramping cutting edge portion, the side surface including an upper set of primary clearance surfaces and a lower set of secondary clearance surfaces including a plurality of planar support surfaces, wherein the upper set of primary clearance surfaces forms an overhang protruding with respect to an entirety of the secondary clearance surfaces, so that extension planes in which the planar secondary clearance surfaces extend are located inside the associated primary clearance surfaces with respect to a central axis of the milling insert, and wherein the protruding overhang extends around the entire upper periphery of the milling insert.

2. The milling insert according to claim 1, wherein the cutting edge extends in parallel with the bottom surface.

3. The milling insert according to claim 1, wherein the upper side includes a planar central region extending in parallel with the bottom surface, wherein the planar central region is recessed with respect to the cutting edge.

4. The milling insert according to claim 1, wherein the major cutting edge portion is convex as seen in a plane parallel with the bottom surface.

5. The milling insert according to claim 1, wherein the milling insert has a thickness $t_{tot}$ in a direction perpendicular to the bottom surface, and wherein the lower set of secondary clearance surfaces extends along at least 50% of the thickness.

6. The milling insert according to claim 1, wherein the overhang has a thickness $t_{oh}$ within the range 0.20 mm≤$t_{oh}$≤0.5 mm in a direction perpendicular to the bottom surface.

7. The milling insert according to claim 1, wherein, when the milling insert is mounted in a tool body, at least one of the planar support surfaces is configured to form an axial support surface and at least another one of the planar support surfaces is configured to form a radial support surface, the radial support surface and the axial support surface forming an acute angle with each other as seen in a plane parallel with the bottom surface.

8. The milling insert according to claim 1, wherein the secondary clearance surfaces are formed at acute seating angles with respect to an upper extension plane parallel with the bottom surface and extending at the level of the cutting edge.

9. The milling insert according to claim 1, wherein the cutting edge includes an additional cutting edge portion positioned between, and forming an angle with, the surface wiping cutting edge portion and the ramping cutting edge portion.

10. The milling insert according to claim 1, wherein the primary clearance surface below the major cutting edge is formed at an overhang angle $\beta_{major}$ with respect to an upper extension plane parallel with the bottom surface and extending at the level of the cutting edge, the overhang angle $\beta_{major}$ decreasing from the corner radius cutting edge portion and along the major cutting edge portion, so that an effective clearance angle along the major cutting edge portion is constant when the milling insert is mounted in a tool body.

11. The milling insert according to claim 10, wherein the secondary clearance surface below the major cutting edge portion is formed at a seating angle $\eta_{major}$ with respect to the upper extension plane, the seating angle $\eta_{major}$ being constant along the major cutting edge portion.

12. The milling insert according to claim 1, wherein the primary clearance surface below the ramping cutting edge portion is formed at an acute overhang angle $\beta_{ramp}$ with respect to an upper extension plane parallel with the bottom surface and extending at the level of the cutting edge, the secondary clearance surface below the ramping cutting edge portion being formed at an acute seating angle $\eta_{ramp}$ with respect to said upper extension plane, and wherein $\beta_{ramp} < \eta_{ramp}$.

13. The milling insert according to claim 1, wherein below each of the major cutting edge portion, the corner radius cutting edge portion, and the surface wiping cutting edge portion, the secondary clearance surface associated with the respective cutting edge portion is formed at an acute seating angle with respect to an upper extension plane parallel with the bottom surface and extending at the level of the cutting edge, and the primary clearance surface associated with the respective cutting edge portion is formed at an acute overhang angle with respect to said upper extension plane, wherein the seating angle is smaller than the overhang angle.

14. The milling insert according to claim 1, wherein the milling insert is indexable with two index positions.

15. A milling tool comprising:
   a tool body; and
   at least one milling insert detachably mounted in an insert seat of the tool body, the at least one milling insert including an upper side having a rake surface; a lower side opposite the upper side, the lower side including a planar bottom surface; a side surface extending between the upper side and the lower side and around a periphery of the milling insert; and a cutting edge formed between the side surface and the rake surface, the cutting edge including at least a major cutting edge portion a corner radius cutting edge portion, a ramping cutting edge portion, and a surface wiping cutting edge portion positioned between the corner radius cutting edge portion and the ramping cutting edge portion and forming an angle with the ramping cutting edge, the side surface including an upper set of primary clearance surfaces, and a lower set of secondary clearance surfaces including a plurality of planar support surfaces, wherein the upper set of primary clearance surfaces forms an overhang protruding with respect to an entirety of the secondary clearance surfaces, so that extension planes in which the planar secondary clearance surfaces extend are located inside the associated primary clearance surfaces with respect to a central axis of the milling insert, and wherein the protruding overhang extends around the entire upper periphery of the milling insert.

\* \* \* \* \*